United States Patent [19]

Schulte-Kulkmann

[11] 3,901,149

[45] Aug. 26, 1975

[54] DEVICE FOR DETERMINING THE TACKINESS OF INKS, PARTICULARLY PRINTING INKS

[75] Inventor: Dieter Schulte-Kulkmann, Munster, Germany

[73] Assignee: Roland Offsetmaschinenfabrik Faber & Schleicher AG, Germany

[22] Filed: Dec. 9, 1974

[21] Appl. No.: 531,047

[30] Foreign Application Priority Data

Dec. 7, 1973 Germany............................ 2360988

[52] U.S. Cl............................... 101/349; 73/150 R
[51] Int. Cl.²......................................... B41F 31/00
[58] Field of Search........................... 101/348–364, 101/148, 206–210; 73/150 R, 150 A

[56] References Cited
UNITED STATES PATENTS

| | | | |
|---|---|---|---|
| 3,368,399 | 2/1968 | Wirz.................................. | 73/150 R |
| 3,442,121 | 5/1969 | Wirz.................................. | 73/150 R |
| 3,516,289 | 6/1970 | MacGeorge...................... | 73/150 R |

Primary Examiner—J. Reed Fisher
Attorney, Agent, or Firm—Wolfe, Hubbard, Leydig, Voit & Osann, Ltd.

[57] ABSTRACT

A device for continuously monitoring the tackiness of ink in a printing press which includes a pair of belts each having parallel first and second supporting pulleys. The first pulleys are mounted closely adjacent to one another and the second pulleys are slightly spaced to produce local contact between the belts plus a small angle of nominal divergence between the adjacent runs of the belts. One of the first pulleys rotates in engagement with an ink feed roller for the purpose of driving the belts so that the adjacent runs move at the same speed in the direction of the divergence and for feeding a film of ink from the feed roller between the belts so that the belts tend to cling together. Resilient means are provided for establishing predetermined tension in the belts so that the length of cling, as measured from the region of local contact constitutes a measure of the tackiness of the ink.

8 Claims, 2 Drawing Figures

DEVICE FOR DETERMINING THE TACKINESS OF INKS, PARTICULARLY PRINTING INKS

In the art of printing, and particularly in lithographic printing, the quality and consistency of the printed result depends upon the physical characteristics of the ink. One variable factor which has been found to have a substantial effect upon printing quality is the "tackiness" of the ink, that is, the degree to which an ink film resists separation, either at the outlet nip of two rollers in the inking system or at the outlet nip between a form roller running in engagement with a plate on a plate cylinder. Auxiliary rollers have been employed in an effort to measure tackiness as set forth in German Pat. No. 1,246,765.

However, when using rollers of practical size there is an inherent high degree of error.

It is, accordingly, an object of the present invention to provide a more accurate and convenient means for measurement of takiness of ink than has been available heretofore. It is a more specific object of the present invention to provide a pair of belts for measuring tackiness of an ink film, the belts being mounted to present plane surfaces to one another which are slightly divergent from a region of local contact and with the belts driven at the same speed in the direction of the divergence and with resilient means for establishing predetermined tension so that the length of cling as measured from region of local contact constitutes an accurate measure of the tackiness of the ink.

It is an object of the invention in one of its aspects to provide means for measuring tackiness which produces accurate and consistent results and which may be readily adjusted, without structural change, to produce accurate readings over a wide range of tackiness.

It is a more specific object of the present invention to provide means for continuous monitoring of the tackiness of the ink in an operating printing press which is capable of producing accurate indication over long press runs, with the ink which is being monitored being constantly renewed from the inking system incident to the driving of the device. As a result, the device is capable of responding to corrective changes made in the ink supply system, either in the ink itself or in the temperature at which the ink is run through the system.

Other objects and advantages of the invention will become apparent upon reading the attached detailed description and upon reference to the drawing in which.

Figure 1:
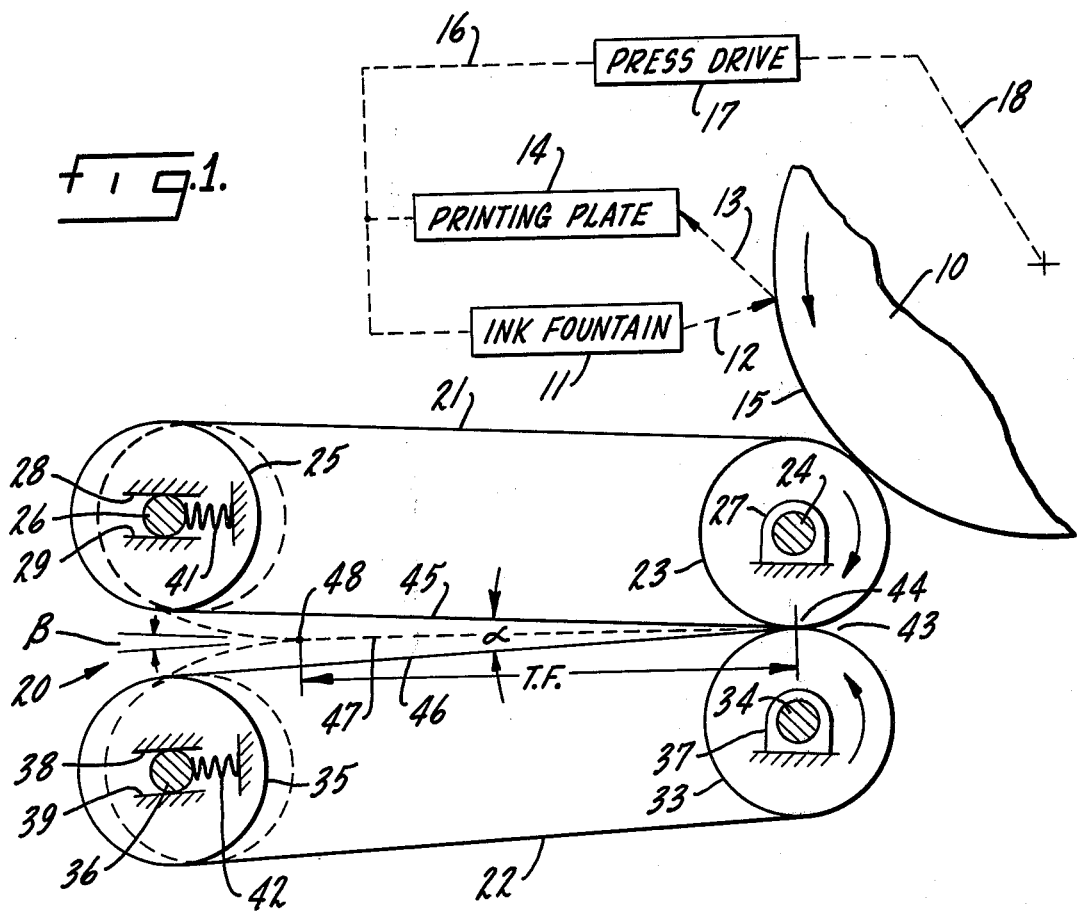
FIG. 1 is a diagram showing a tackiness monitoring device constructed in accordance with the present invention but with only a portion of one of the rollers in the ink feed system being shown.

While the invention has been described in connection with certain preferred embodiments, it will be understood that I do not intend to be limited to the particular embodiments shown but intend, on the contrary, to cover the various alternative and equivalent constructions included within the spirit and scope of the appended claims.

Turning now to the drawing, there is shown at 10 a typical inking roller in an ink feed system. Such ink feed system originates in a fountain 11, with the ink from the fountain being conducted to the inking roller along a path 12. After leaving the inking roller 10, the film of ink follows a path generally indicated at 13 leading to the printing plate 14. Thus the inking roller 10 will at all times have upon its surface a film of ink 15 which is representative of that which is being fed from the fountain to the plate.

It will be understood that the fountain, plate cylinder and other driven elements are mechanically connected through suitable driving means 16 to the press drive 17. The press drive through means 18 either direct or indirect serves to rotate the ink feed roller 10 in the direction shown by the arrow. While the roller 10 may be considered, for convenience, to be in the direct feed path to the printing plate, the roller need not be in the direct feed path and may be an ancillary smoothing roller which partakes of the ink in the direct feed path.

While the ink fountain 11 has been shown only diagrammatically, it will be understood that such fountain is provided with all of the usual adjustments which determine the thickness and lateral distribution of the ink being fed through the ink roller system.

In accordance with the invention a pair of flexible belts are used to monitor the tackiness of the ink film 15 and for determining whether the tackiness of the ink which is being fed is greater or less than that required for high quality printing. The belts have first and second supporting pulleys defining adjacent and remote runs, the first pulleys being mounted closely adjacent one another and the second pulleys being slightly spaced to produce local contact between the belts plus a small angle of nominal divergence. For driving the belts and for feeding and replenishing the ink thereon, one of the first pulleys is positioned in line engagement with the surface of the ink feed roller so that the belts are driven at the same speed in the direction of divergence so that the film of ink on the belts causes the adjacent runs to cling together. Resilient means are provided for establishing predetermined tension in the belts so that the length of cling as measured from the region of local contact constitutes an accurate measure of the tackiness of the ink.

Thus, referring to FIG. 1, the tackiness measuring and monitoring device, indicated generally at 20 includes a first belt 21 and a second belt 22. The first belt is trained about a first pulley 23 having a shaft 24 and around a second pulley 25 having a shaft 26. The shaft 24 is journalled in a stationary mount 27 while the second shaft 26 is mounted for constrained lateral movement, for example between parallel way surfaces 28, 29.

The second belt is, in the embodiment shown in FIG. 1, mounted in similar fashion. That is, the belt is trained about a first pulley 33 having a shaft 34 and a second pulley 35 having a shaft 36. The shaft of the first pulley is journalled in a stationary mount 37 while the shaft of the second pulley is constrained to lateral movement between guide or way surfaces 38, 39.

In carrying out the present invention both of the belts are provided with resilient means for exerting tension, that is, with resilient means for urging the first and second pulleys away from one another. In the case of the first belt this function is served by a compression spring 41 whereas the second belt is tensioned by a compression spring 42. It will be understood that the belts and the pulleys which carry them may be of any convenient width and that the belt tensioning springs 41, 42 may be provided in pairs, that is, one spring at each of the ends of the shaft.

For the purpose of driving the belts and for simultaneously feeding and replenishing the film of ink thereon during the course of operation of the press, one of the "first" pulleys 23, 33 is caused to engage the surface of the ink roller 10 for the purpose of picking up a portion of the film 15 and for conducting the film to the nip 43 just ahead of the region 44 where the two belts are in local engagement. The pressure between the two pulleys 23, 33 is sufficient so that the belt 22 on the pulley 33 is reliably driven, in the direction of the divergence, at a speed which is exactly the same as the speed of the belt 21. The angle of divergence, indicated at $\alpha$, is sufficiently shallow, on the order of 1° to 10°, so that the adjacent runs of belt indicated at 45, 46 tend to cling together along the dotted line 47. The spring rate of the biasing springs 41, 42 is preferably such as to cause the clinging, under conditions of optimum tackiness, to extend appreciably along the belt runs, as, for example, to a point 48 where the force of adhesion is finally exceeded by the force of separation, causing the film which is between the belts to be torn apart. It will be apparent to one skilled in the art that the more tacky the ink film the longer the distance of cling so that the distance of cling is subject to a direct measurement of "tackiness factor", T.F.

It is one of the features of the present invention that the tensioning force exerted by the springs 41, 42 may be made relatively high and the angle of divergence $\alpha$ may be made small so that the angle between the belts at the point of separation 48 may be caused to be small as indicated at $\beta$. This, plus a large area in contact, typically from 20 to 150 sq. Cm., is found to produce more accurate and consistent measurements of tackiness than is possible where the total area in contact is small as in the above-mentioned German patent. It will be understood that while the shafts of the second pulleys 25, 35 are mounted for freedom of lateral movement, the amount of lateral movement which will occur in a practical case will be extremely limited.

Not only does the distance T.F. constitute an accurate measure of the tackiness of the ink initially flowing through the system, but the ink is constantly replenished, with additional ink being fed into the monitoring device from the film 15 and into the nip 43; but the film of ink on the remote runs of the belts will be constantly removed so that it does not accumulate. This removal takes place directly from the remote run of belt 21 and indirectly from the remote run of belt 22 by reason of the fact that the two belts are in continuous, sharing contact with one another.

As a result, the device acts as a continuous monitor of the tackiness of the ink flowing through the ink supply system to the printing plate, subject to continuous observation so that corrective changes may be made during the course of a printing run. Such corrective changes may take a number of different forms, for example, the constitution of the ink itself may be changed or a source of heat or cold in the ink feed path may be correctively adjusted thereby to compensate for heat build up as a result of working of the ink or changes in the ambient temperature.

Figure 2:
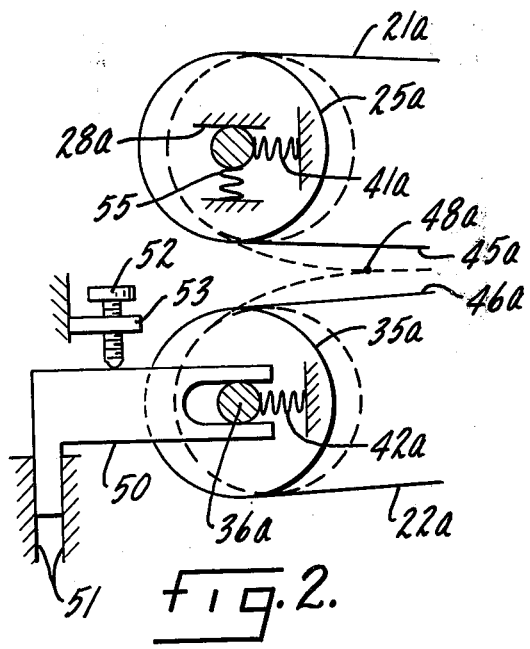
FIG. 2 is a fragmentary diagram showing a modified mounting means.

While the desired result may be achieved by simple belt tensioning springs as illustrated in FIG. 1, in which the spacing of the shafts 26, 36 is fixed, provision may be made for adjusting the angle $\alpha$ of nominal divergence. Such angle may be adjusted, as shown in FIG. 2, by providing a vertically shiftable yoke 50 which captively embraces the shaft 36a and which is vertically slidable in a pair of way surfaces 51. The position of the yoke 50, and hence the elevation of the shaft 36a may be determined by any convenient adjusting means as, for example, an adjustable thumb screw 52 threaded into a stationary bracket 53. It will be apparent that by turning the thumb screw 52 in one direction or the other the divergence angle $\alpha$ may be easily and quickly changed to accommodate the device to inks having a wide range of tackiness factors. Also, if desired, the second roller 25a engaging the upper belt may be made vertically movable yet biased against supporting surface 28a by means of an auxiliary spring 55. In this way the belt tensioning springs 41a, 42a may be made quite stiff to minimize the separation angle $\beta$ with the clinging force being directly balanced against the force of compression of the auxiliary spring 55.

It is one of the features of the present construction that the belts 21, 22 may be made of any thin, flexible, yet durable, material having a surface which is adherent to the ink, which is of a greasy nature. Thus the belts may be made of fabric coated or impregnated with a synthetic rubber composition of a type impervious to ink. Or, as an alternative, a plastic film may be employed using any one of the available plastic materials meeting the conditions, particularly the affinity for ink, mentioned above.

It is a still further feature of the present invention that one or both of the belts may be made of an elastic material as, for example, a thin impervious layer of synthetic rubber without the fabric reinforcement. In such event the shafts 24, 34 of the first rollers and the shafts 26, 36 of the second rollers may all be fixedly mounted although adjustable, for convenience, to enable variation in the divergence angle and in the degree of tension in the adjacent belt runs.

It will be apparent, then, that the present invention constitutes a convenient mode of measuring and monitoring tackiness of ink under practical press room conditions with a high degree of reliability but with a device which is inherently simple and inexpensive to install and to maintain. Since the range of cling distance may be increased by increasing the belt length and since the cling area may be further increased by increasing belt width, the tackiness of the ink is effectively amplified to provide a wide variation in tackiness factor and a high degree of sensitivity to changes in tackiness.

While the device has primary utility as a monitor providing a constant indication of tackiness for information and as a basis for corrective adjustment, the device need not be left connected continuously but may be backed away from contact with the feed roller after a tackiness measurement has been made and until the next measurement is required. If it is desired to prevent drying out of the ink between measurements it will be apparent that a driven solvent roller may be provided adjacent the feed roller 10 and that the pulleys may be mounted in a carriage for bodily shifting of the belt assembly from (1) the operating position illustrated in FIG. 1 to (2) a retracted position, and then to (3) a cleansing position in which one of the belts is in driving engagement with the solvent roller, with the latter maintained until the belts are free of the ink.

What I claim is:
1. In a device for continuously monitoring the tackiness of inks in an operating printing press, the combina- tion comprising an inking system having means for feeding of ink from a source to a printing plate, a pair of belts each having parallel first and second supporting pulleys defining adjacent and remote runs of the belts, the first pulleys being mounted closely adjacent one another and the second pulleys being mounted in slightly spaced relation to provide local contact between the belts at the first pulleys plus a small angle of nominal divergence between the adjacent runs, means for driving the belts so that the adjacent runs move at the same speed in the direction of the divergence and for transferring ink from the inking system to the belts in the region of the first pulleys so that the adjacent runs of the belts tend to cling together, and resilient means for establishing predetermined tension in the belts so that the length of cling as measured from the region of local contact constitutes an accurate measure of the degree of tackiness of the ink.

2. In a device for continuously monitoring the tackiness of inks in an operating printing press, the combination comprising an inking system including an ink feed roller and having means for feeding of ink from a source to a printing plate, a pair of belts each having parallel first and second supporting pulleys defining adjacent and remote runs of the belts, the first pulleys being mounted closely adjacent one another and the second pulleys being mounted in slightly spaced relation to produce local contact between the belts at the first pulleys plus a small angle of nominal divergence between the adjacent runs, one of the first pulleys being positioned in running engagement with the surface of the ink feed roller for driving of the belts at the same speed in the direction of divergence and for constant transfer of ink to the belts so that the adjacent runs of the belts tend to cling together, and resilient means for establishing predetermined tension in the belts so that the length of cling as measured from the region of local contact constitutes an accurate measure of the degree of tackiness of the ink.

3. The combination as claimed in claim 1 in which at least one of the second supporting pulleys is resilient mounted.

4. The combination as claimed in claim 1 in which both of the second supporting pulleys are resiliently mounted.

5. The combination as claimed in claim 1 in which means are provided for swinging one of the second pulleys about its associated first pulley and for holding it in a predetermined position with respect to the other second pulley thereby to adjust the angle of nominal divergence between them.

6. The combination as claimed in claim 1 in which at least one of the second pulleys has a stop surface to define a limit position for establishing a nominal divergence angle for the belts together with biasing means acting in a direction toward the stop surface, the biasing means being at such a force level as to be at least partially overcome by the clinging force between the belts so that the effective divergence angle is reduced as a result of the clinging force.

7. The combination as claimed in claim 1 in which at least one of the belts is formed of elastic material.

8. The combination as claimed in claim 2 in which the angle of the nominal divergence between the adjacent runs of belt lies within the range of approximately 1° to approximately 10°.

* * * * *